T. L. LEACH.
SPOON CUP AND BELL.
No. 106,066.  Patented Aug. 2, 1870.
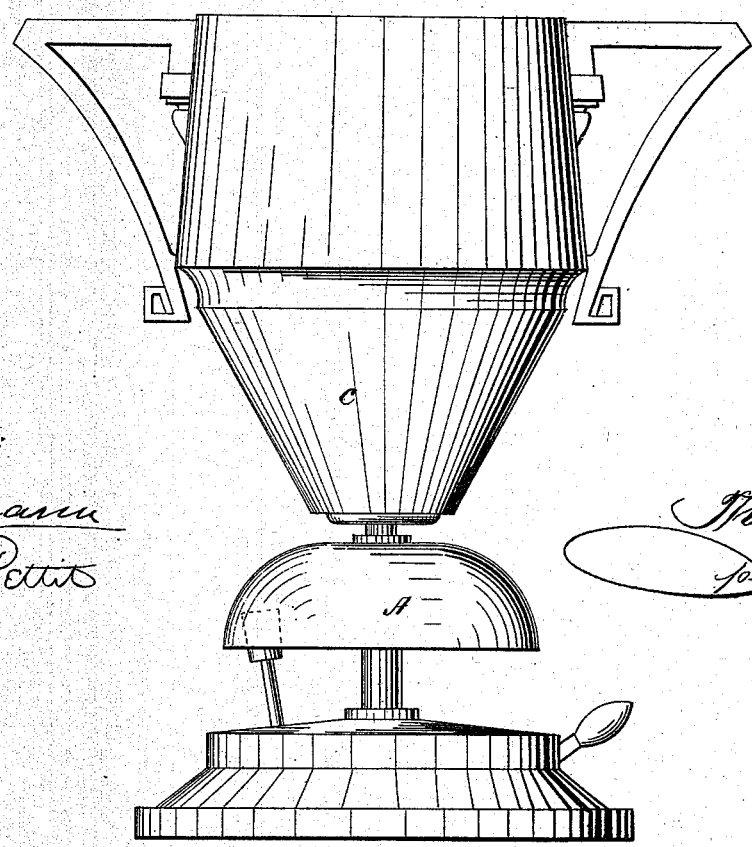
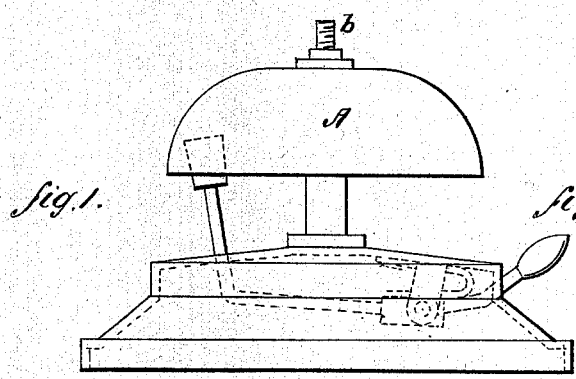
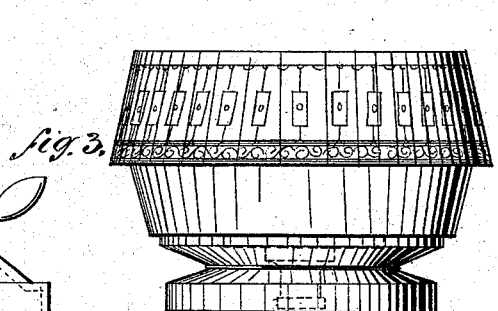

United States Patent Office.

THOMAS LEACH, OF TAUNTON, MASSACHUSETTS, ASSIGNOR TO HENRY G. REED, GEO. BRABROOK, AND HENRY H. FISH, OF SAME PLACE.

Letters Patent No. 106,066, dated August 2, 1870.

IMPROVED CUP AND BELL.

The Schedule referred to in these Letters Patent and making part of the same.

*To all whom it may concern:*

Be it known that I, THOMAS LEACH, of Taunton, in the county of Bristol and State of Massachusetts, have invented a new and Improved Combined Cup and Bell; and I do hereby declare that the following is a full, clear, and exact description of the same, reference being had to the accompanying drawing making a part of this specification, in which—

Figure 1 is a side elevation of the bell and stem, to which a spoon-cup is screwed;

Figure 2 is a side elevation of bell and spoon-cup combined; and

Figure 3 is a side elevation of a cup or salt-cellar.

This invention consists in the combination of the well-known call-bell with a cup, as and for the purpose to be hereinafter explained.

In the drawing—

A is the bell.

$b$ the threaded stem projecting upward from the top of the sounder.

$c$, a spoon-cup, provided in its lower part with a threaded orifice, by means of which it may be screwed upon the stem $b$.

This being done, there results a domestic utensil capable of being so made as to present an elegant appearance, and, at the same time, subserve a useful purpose. The bell being a stationary article, the other member of the combination should be stationary also, and, instead of being a spoon-cup, may be a salt-cellar, as shown in fig. 3.

It is obvious that a great variety of articles may be so constructed as to be capable of screwing upon the stem $b$, and one after another may be attached to the bell, as convenience may require.

Having thus described my invention,

What I claim as new, and desire to secure by Letters Patent, is—

The combination of a call-bell and cup, as specified.

THOMAS LEACH.

Witnesses:
WILLIAM W. SWAN,
GEO. E. CHAMBERS.